(12) United States Patent
Katoh

(10) Patent No.: US 6,513,746 B2
(45) Date of Patent: Feb. 4, 2003

(54) WEBBING TAKE-UP DEVICE

(75) Inventor: Keiichi Katoh, Niwa-gun (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/783,397

(22) Filed: Feb. 15, 2001

(65) Prior Publication Data

US 2001/0015391 A1 Aug. 23, 2001

(30) Foreign Application Priority Data

Feb. 21, 2000 (JP) ...................................... 2000-043315

(51) Int. Cl.$^7$ ............................................. B60R 22/44
(52) U.S. Cl. ..................................................... 242/372
(58) Field of Search ................................ 242/372, 375, 242/375.1; 280/806, 807; 297/475–478

(56) References Cited

U.S. PATENT DOCUMENTS

| 4,026,494 A | * | 5/1977 | Tanaka | 242/372 |
| 4,165,844 A | * | 8/1979 | Tanaka | 242/372 |
| 4,301,977 A | * | 11/1981 | Yang | 242/375.3 |
| 4,303,208 A | * | 12/1981 | Tanaka | 242/372 |
| 4,913,372 A | * | 4/1990 | Takada | 242/372 |
| 5,080,298 A | * | 1/1992 | Sasaki et al. | 242/372 |
| 5,265,823 A | * | 11/1993 | Doty | 242/372 |
| 5,285,982 A | * | 2/1994 | Kopetzky | 242/372 |
| 5,328,119 A | * | 7/1994 | Sasaki | 242/372 |
| 5,411,221 A | * | 5/1995 | Collins et al. | 242/372 |
| 5,553,802 A | * | 9/1996 | Park et al. | 242/372 |

* cited by examiner

Primary Examiner—John M. Jillions
(74) Attorney, Agent, or Firm—Nixon Peabody LLP; Thomas W. Cole (57) ABSTRACT

A webbing take-up device which, when a webbing belt is pulled out, can reduce the rewind urging force applied to the vehicle occupant by the belt. The take-up device includes a spool 20 for winding a webbing belt, a take-up shaft that is connected to the spool, a shaft member connected to the take-up shaft via adapters 30, 44, a torsion coil spring 56 connected between a ratchet wheel 52 and adapter 44, another torsion coil spring 60 connected between the adapters 30, 44 and a spiral spring 48 connected to the shaft member. When the belt is pulled out and secured over an occupant, a plunger 70 engages ratchet wheel 52, and torsion coil spring 56 is wound tighter on the adapter 44. The resultant frictional force and urging force of the torsion coil spring 60 is greater than the urging force of the spiral spring 48. Thus, slack is present in the torsion coil spring 60, and the adapter 30 rotates relatively to the adapter 44. In this way, the urging force of the spiral spring 48 is not completely applied to the spool 20, thus relieving the occupant of the full rewind force of spring 48.

15 Claims, 6 Drawing Sheets

WEBBING TAKE-UP DEVICE

BACKGROUND OF THE INVENTION

1. Field of the Invention

The present invention relates to a webbing take-up device which restrains a vehicle occupant by a webbing belt.

2. Description of the Related Art

A webbing take-up device forms a main portion of a seat belt device which restrains the body of a vehicle occupant by an elongated webbing belt. In the webbing take-up device, a take-up shaft which takes up the webbing belt is urged by an urging device such as a spiral spring in a direction of taking up the webbing belt. (Hereinafter, for convenience of explanation, the rotating direction in the direction of taking up the webbing belt will be called the "take-up direction", and the rotating direction in the direction opposite to the take-up direction will be called the "pull-out direction".) When a vehicle occupant cancels the state in which the webbing belt is applied to him or her, due to the urging force of the urging device such as that described above, the webbing belt is taken up onto the take-up shaft and is accommodated.

Further, the urging force of an urging device such as a spiral spring increases in accordance with the amount of the webbing belt which is pulled out. Thus, when the webbing belt is applied, a compressing sensation caused by the urging force of the urging device is applied to the vehicle occupant to which the webbing belt is applied. As a result, in recent years, webbing take-up devices have been proposed which are provided with a so-called tension reducer mechanism which, in a state in which the webbing belt is pulled out to a predetermined amount, reduces the urging force of the urging device such that the aforementioned constricting sensation is mitigated.

There are tension reducer mechanisms of a type utilizing a structure in which the rotational force of a shaft member, which rotates coaxially and integrally with the take-up shaft, which rotational force is due to the urging force of the urging device is lessened by the frictional force at the time when a torsion coil spring, which is wound in a spiral shape around the shaft member, is fit closely to the outer peripheral portion of the shaft member. Hereinafter, this type of tension reducer mechanism will be briefly explained.

This type of tension reducer mechanism includes a ratchet wheel which is provided so as to be able to rotate coaxially with and relative to the take-up shaft. One end of the torsion coil spring is anchored on the ratchet wheel. The take-up shaft passes through the inner side of the torsion coil spring, and the other end of the torsion coil spring is anchored on the take-up shaft. When the ratchet wheel rotates relatively with respect to the take-up shaft in the pull-out direction, the torsion coil spring is wound tighter, and is ultimately set in close contact with the outer peripheral portion of the take-up shaft.

The ratchet wheel is generally rotatable. However, when an engagement pawl, which is formed at a plunger for locking which is provided next to the ratchet wheel, engages with the outer peripheral portion of the ratchet wheel, the ratchet wheel can rotate in the pull-out direction, but rotation thereof in the take-up direction is restricted.

Namely, when the webbing belt is applied to an occupant, and the rotation of the ratchet wheel is restricted by the engagement pawl of the plunger, the rotation of the take-up shaft in the take-up direction due to the urging force of the spiral spring becomes relative rotation in the take-up direction with respect to the ratchet wheel. At this time, the ratchet wheel rotates in the pull-out direction when viewed from the standpoint of the take-up shaft. Therefore, when the take-up shaft rotates to a certain extent, the torsion coil spring is wound tighter, and begins to fit closely to the outer peripheral portion of the take-up shaft. The torsion coil spring, one end of which is anchored to the ratchet wheel, cannot rotate integrally with the take-up shaft. Thus, a frictional force is generated between the outer peripheral portion of the take-up shaft and the torsion coil spring. This frictional force acts to prevent rotation of the take-up shaft in the take-up direction. Thus, a force, which is of a magnitude equal to the urging force of the spiral spring minus the frictional force, is the restraining force of the webbing belt. Accordingly, the restraining force is less than a case in which the urging force of the spiral spring is directly applied to the vehicle occupant and thus, the compressive sensation can be mitigated.

In a state in which a vehicle is traveling normally, when the body of a vehicle occupant sways due to slight movements of the vehicle or the like, the body of the vehicle occupant (in particular, the shoulders or the like of the vehicle occupant) may pull the webbing belt. However, in this case, in the tension reducer mechanism of the above-described type, the urging force of the spiral spring applied to the webbing belt cannot be reduced from a structural standpoint. When the body of the vehicle occupant attempts to pull the webbing belt out, the full urging force of the spiral spring is applied to the body of the vehicle occupant.

SUMMARY OF THE INVENTION

In view of the aforementioned, an object of the present invention is to provide a webbing take-up device in which, when a webbing belt is pulled out, the urging force applied in the direction of taking up the webbing belt can be reduced.

A first aspect of the present invention is a webbing take-up device for taking up an elongated webbing belt for restraining a body of a vehicle occupant, the webbing take-up device comprising: (a) a take-up shaft to which one longitudinal direction end of the webbing belt is anchored, and which takes up the webbing belt by rotating in a take-up direction which is one direction around an axis of the take-up shaft; (b) a shaft member provided so as to be rotatable coaxially with and relatively to the take-up shaft; (c) a first urging device connected to the shaft member, the first urging device urging the shaft member in the take-up direction by urging force of a magnitude corresponding to an amount of rotation of the shaft member in a pull-out direction which is opposite to the take-up direction; and (d) a second urging device connecting the take-up shaft and the shaft member such that the take-up shaft and the shaft member are able to rotate relatively over a predetermined angle, and when an angle of rotation in the pull-out direction of the shaft member with respect to the take-up shaft exceeds a predetermined angle, the second urging device connects the shaft member and the take-up shaft integrally such that the shaft member and the take-up shaft are able to rotate in the pull-out direction.

A second aspect of the present invention is a webbing take-up device used in a seat belt device of a vehicle, the webbing take-up device comprising: (a) a take-up shaft to which one end of a webbing is anchored, and which is able to rotate in a webbing take-up direction and in a webbing pull-out direction which is opposite to the webbing take-up direction; (b) a first urging device which urges the take-up shaft in the webbing take-up direction; and (c) a second urging device which, while rotation of the take-up shaft in the webbing pull-out direction is within a predetermined angle, urges the take-up shaft in the webbing pull-out direction by an urging force which is less than an urging force of the first urging device.

In accordance with the webbing take-up devices having the above-described structures, when the webbing belt is pulled out, the take-up shaft rotates in the pull-out direction. At this time, the second urging device attempts to rotate, by the urging force thereof, the shaft member to follow the rotation of the take-up shaft. However, because the urging force of the first urging device is greater than the urging force of the second urging device, the shaft member cannot rotate in the same direction as the rotating direction of the take-up shaft. Accordingly, the take-up shaft rotates in the pull-out direction relatively to the shaft member. In a state in which the take-up shaft has rotated a predetermined angle in the pull-out direction relative to the shaft member, when the webbing belt is pulled out further, the shaft member rotates in the pull-out direction integrally with the take-up shaft, and the first urging device urges the take-up shaft in the take-up direction via the shaft member.

Next, in the case where pulling out of the webbing belt has been completed and the other end of the webbing belt is fixed, the first urging device attempts to rotate, by the urging force thereof, the shaft member in the take-up direction. Here, if the restriction of rotation of the shaft member in the take-up direction by the shaft member rotation restricting mechanism is canceled, the second urging device makes the shaft member and the take-up shaft integral at the time the webbing belt is pulled out. Thus, the urging force of the first urging device is transferred as is to the take-up shaft. The urging force of the first urging device, as is, is the restraining force for restraining the body of the vehicle occupant by the webbing belt.

On the other hand, when rotation of the shaft member in the take-up direction is restricted by the shaft member rotation restricting mechanism, the restricting force at this time acts against the urging force of the first urging device. Thus, the rotational force of the shaft member in the take-up direction is reduced.

Further, the resultant force of the restricting force of the shaft member rotation restricting mechanism and the urging force of the second urging device in the state in which the take-up shaft is rotated a predetermined angle in the pull-out direction relative to the shaft member, is greater than the urging force of the first urging device. Thus, until this resultant force is in balance with the urging force of the first urging device, the second urging device rotates, by its urging force, the take-up shaft in the take-up direction relatively to the shaft member. In this way, the integral connection of the take-up shaft and the shaft member by the second urging device is canceled (i.e., although the take-up shaft and the shaft member are mechanically connected, relative rotation thereof is possible.)

In this state, some or all of the urging force of the first urging device is offset by the restricting force of the shaft member rotation restricting mechanism. Thus, the restraining force is lower than in a case in which the urging force of the first urging device is, as is, the restraining force. Therefore, the compressing sensation when the webbing belt is applied is alleviated.

Due to the urging force of the second urging device rotating the take-up shaft in the take-up direction and relative rotation of the shaft member with respect to the take-up shaft being enabled, even if the webbing belt is pulled out when applied, the urging force of the first urging device, which does not rotate the take-up shaft a predetermined angle in the pull-out direction with respect to the take-up shaft, is not applied to the shaft member. Accordingly, in this state, due to the application of a tensile force of an extent which resists the urging force of the second urging device, the webbing belt can be pulled out by a predetermined amount. The compressive sensation of the webbing belt at the time when the body of the vehicle occupant attempts to pull out the webbing belt due to slight vibrations or the like while the vehicle is traveling, can be mitigated.

In accordance with the webbing take-up devices having the above-described structures, when the webbing belt is pulled out and the take-up shaft is rotated in the pull-out direction and the take-up shaft rotates a predetermined angle in the pull-out direction with respect to the shaft member and the take-up shaft and the shaft member become integral and the shaft member rotates in the pull-out direction, the rotating body connected to the shaft member via the third urging device rotates in the pull-out direction, following the rotation of the shaft member.

Next, in the webbing belt applied state in which pulling out of the webbing belt is completed and one end of the webbing belt is fixed, the first urging device attempts to rotate, by the urging force thereof, the shaft member in the take-up direction.

At this time, when the rotation body restricting device, which, together with the rotating body and the third urging device, forms the shaft member rotation restricting mechanism, restricts rotation of the rotating body in the take-up direction, even if the shaft member rotates in the take-up direction by the urging force of the first urging device, the rotating body cannot follow this rotation. As a result, the shaft member rotates in the take-up direction relative to the rotating body. When the shaft member rotates a predetermined angle relatively to the rotating body, the third urging device is fit tightly to the outer peripheral portion of the shaft member. At this time, rotation of the shaft member in the take-up direction is restricted due to the frictional force arising between the third urging device and the shaft member.

DESCRIPTION OF THE PREFERRED EMBODIMENTS

Figure 1:
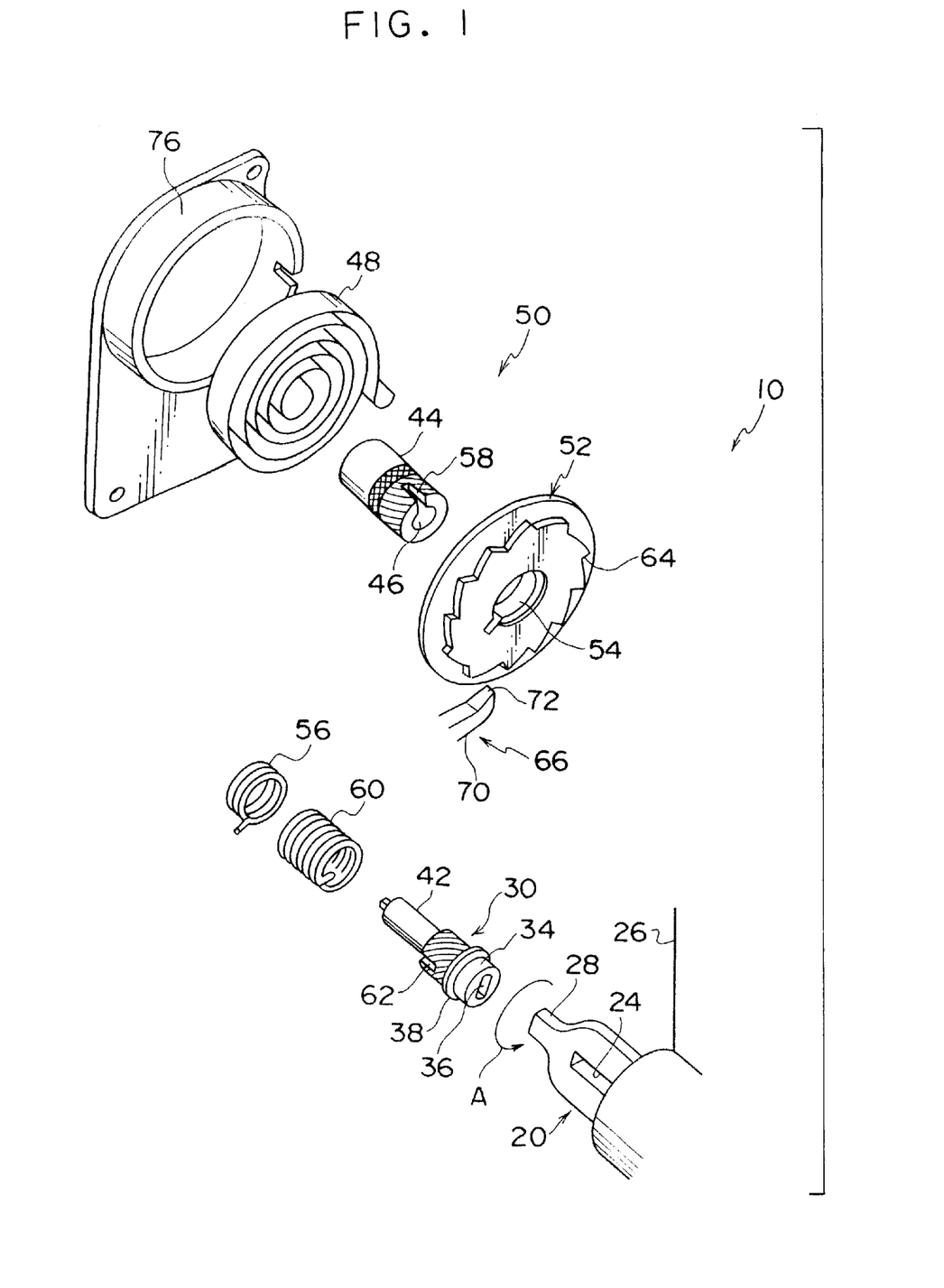
FIG. 1 is an exploded perspective view of main portions of a webbing take-up device relating to a first embodiment of the present invention.
Figure 2:
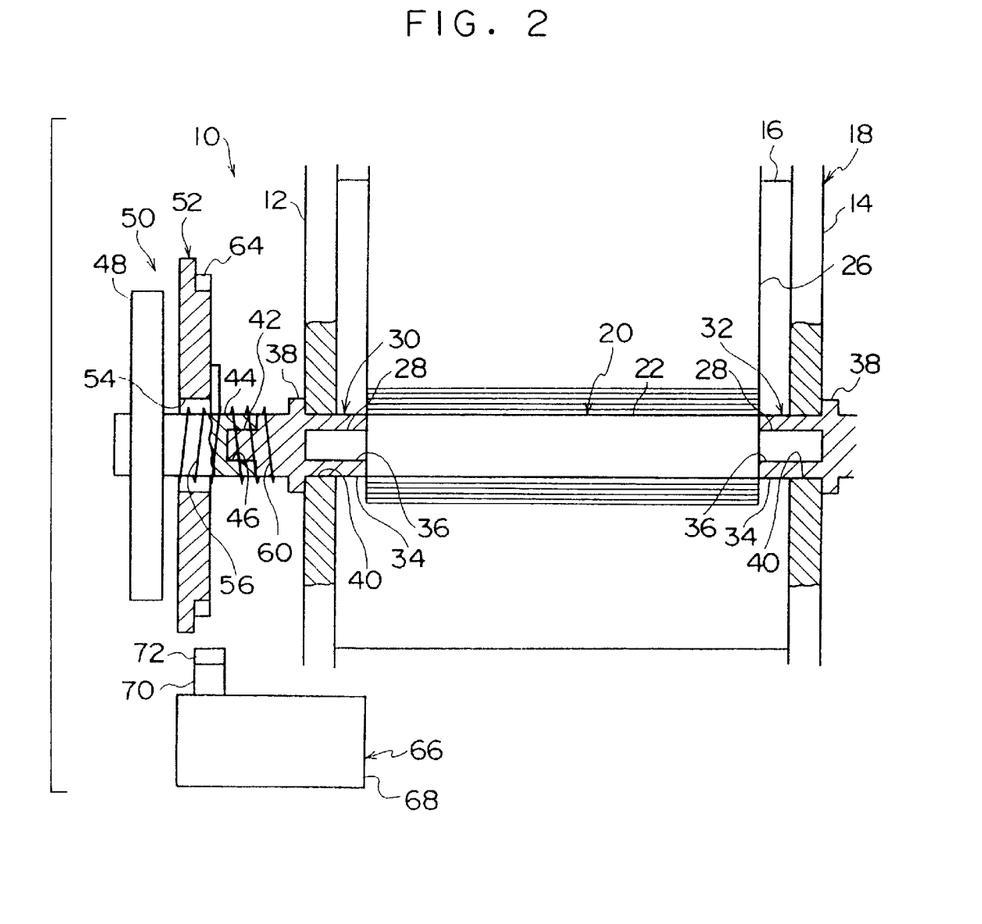
FIG. 2 is a vertical sectional view illustrating a structure of the webbing take-up device relating to the embodiment of the present invention.

In FIG. 2, a structure of a webbing take-up device 10 relating to an embodiment of the present invention is illustrated in a sectional view. In FIG. 1, the structure of main portions of the webbing take-up device 10 is illustrated in an exploded perspective view.

As illustrated in FIG. 2, the webbing take-up device 10 includes a frame 18 which is formed by a pair of side walls 12, 14 which oppose one another along a thickness direction, and a connecting portion 16 which connects the side wall 12 and the side wall 14 in transverse direction end portions thereof A spool main body 22, which forms a spool 20 serving as a take-up shaft, is disposed at the inner side of the frame 18, i.e., between the side wall 12 and the side wall 14.

The spool main body 22 is formed in a substantially elongated plate shape which is long along the thickness direction of the side walls 12, 14. A slit-shaped anchor portion 24 is formed at the spool main body 22. One longitudinal direction end of an elongated webbing belt 26, whose transverse direction is along the longitudinal direction of the spool main body 22, is anchored at the anchor portion 24. The axial direction of the spool main body 22 is the longitudinal direction thereof. Due to the spool main body 22 rotating in one direction around this axis (i.e., in the direction of arrow A in FIG. 1), the webbing belt 26 can be taken out. Note that, in the following description, for convenience of explanation, the direction in which the spool main body 22 takes up the webbing belt 26 and the rotating direction in the same direction as this direction are called the "take-up direction", and the direction opposite to the take-up direction and the rotating direction thereof are called the "pull-out direction".

Rectangular-block-shaped fit-together portions 28 are formed at the both longitudinal direction end portions of the spool main body 22. The fit-together portion 28 at the side wall 12 side is fit into an adapter 30. The fit-together portion 28 at the side wall 14 side is fit into an adapter 32. The adapter 30 and the adapter 32 are each provided with an adapter main body 34 which is formed in a cylindrical shape on the whole. A fit-together hole 36 is formed in one axial direction end portion of the adapter main body 34 of the adapter 32, and in the other axial direction end portion of the adapter main body 34 of the adapter 30. By inserting fit-together portions 28 of the spool main body 22 into the fit-together holes 36, the adapters 30, 32 and the spool main body 22 are connected. Further, a flange portion 38 extends from the outer periphery of the axial direction intermediate portion of the adapter main body 34 of each of the adapters 30, 32, outwardly in the radial direction of the adapter main bodies 34.

Supporting holes 40 are formed in the side walls 12, 14 in correspondence with the adapters 30, 32. The supporting hole 40 is a through hole having a circular configuration. The inner diameter dimension of the supporting hole 40 is slightly larger than the outer diameter dimension of the adapter main body 34 of the adapter 30 or 32, and is sufficiently smaller than the outer diameter dimension of the flange portion 38. The supporting hole 40 at the side wall 12 side and the supporting hole 40 at the side wall 14 side are coaxial. In a state in which the adapter 30 and the adapter 32 are both connected to the spool main body 22, the adapters 30, 32 can pass through the corresponding supporting holes 40, and can rotate freely around their own axes in this state of passing through the supporting holes 40.

A shaft portion 42, which has a smaller diameter than that of the adapter main body 34, is formed coaxially with the adapter main body 34 from the end portion of the adapter 30 opposite to the side in which the fit-together hole 36 is formed. An adapter 44 serving as a shaft member is provided at the side of the adapter 30 at which the shaft portion 42 is formed. The adapter 44 is formed on the whole in a cylindrical configuration. A circular hole 46, which opens toward the adapter 30, is formed in the adapter 44. The circular hole 46 is formed coaxially with the outer peripheral portion of the adapter 44. The inner diameter dimension of the circular hole 46 is slightly larger than the outer diameter dimension of the shaft portion 42 of the adapter 30. Due to the shaft portion 42 being accommodated in the circular hole 46, the adapter 44 is connected so as to be able to rotate around its own axis, coaxially and relatively with respect to the adapter 30.

A spiral spring 48 serving as a first urging device is disposed at the side of the adapter 44 opposite to the side at which the adapter 30 is provided. The end portion of the spiral spring 48, which end portion is positioned at the central side of the spiral thereof, is anchored to the adapter 44. The end portion of the spiral spring 48, which end portion is positioned at the outer side of the spiral, is anchored to a spring case 76 (see FIG. 1) which is fixed to the side wall 12 of the frame 18 or to the vehicle body or the like by a fastening member such as a screw. Due to the adapter 44 rotating in the take-up direction, the spiral spring 48 becomes a tightly-wound spiral configuration. Due to the adapter 44 rotating around its own axis from a predetermined initial state, the spiral spring 48 urges the adapter 44 in the opposite direction.

Further, a ratchet wheel 52 is disposed at a radial direction outer side of the adapter 44. The ratchet wheel 52 serves as a rotating body and forms a tension reducer mechanism 50 serving as a shaft member rotation restricting mechanism. The ratchet wheel 52 is formed on the whole in a disc-shape, and a circular through-hole 54, which passes through in the thickness direction (axial direction), is formed in the radial direction center of the ratchet wheel 52. The inner diameter dimension of the through hole 54 is larger than the outer diameter dimension of the adapter 44, and the adapter 44 passes through the through hole 54. In a state in which the adapter 44 passes through the though hole 54, the ratchet wheel 52 is rotatable relative to the adapter 44.

A torsion coil spring 56 serving as a third urging device is disposed at the radial direction outer side of the adapter 44. In a natural state (i.e., in a state in which no external force is applied), the torsion coil spring 56 forms a screw-like configuration whose inner diameter dimension is greater than the outer diameter dimension of the adapter 44, and the adapter 44 passes through the inner side thereof. One end of the torsion coil spring 56 is anchored on an anchor groove 58 formed at the adapter 44. The other end of the torsion coil spring 56 is anchored on the ratchet wheel 52. Due to the ratchet wheel 52 rotating in the take-up direction relatively with respect to the adapter 44, the torsion coil spring 56 is wound tighter such that the inner diameter dimension thereof decreases. The urging force of the torsion coil spring 56 is smaller than the urging force of the spiral spring 48 which is generated when the adapter 44 is rotated with respect to the ratchet wheel 52 which is static.

One end of a torsion coil spring 60 which serves as a second urging device is anchored to an anchor groove 58. In a natural state (i.e., in a state in which no external force is applied), the torsion coil spring 60 forms a screw-like configuration whose inner diameter dimension is greater than the outer diameter dimension of each of the adapter main body 34 of the adapter 30 and the adapter 44, and both the adapter main body 34 of the adapter 30 and the adapter 44 are disposed at the inner side of the torsion coil spring 60. Further, the other end portion of the torsion coil spring 60 is anchored on an anchor groove 62 formed at the adapter main body 34 of the adapter 30. Due to the adapter 30 rotating in the pull-out direction relative to the adapter 44, the torsion coil spring 60 is wound tighter such that the inner diameter dimension thereof decreases. The urging force of the torsion coil spring 60 is smaller than the urging force of the spiral spring 48 which is generated when the adapter 44 rotates with respect to the adapter 30 which is static.

Ratchet teeth 64 are formed on the outer peripheral portion of the radial direction side of the ratchet wheel 52. A solenoid unit 66 serving as a rotating body rotation restricting device is disposed at a radial direction side of the ratchet wheel 52. The solenoid unit 66 has a case 68 which houses a solenoid (not shown) therein, and has a plunger 70, a portion of which projects from the case 68 toward the ratchet wheel 52. Due to, for example, the solenoid within the case 68 being energized and excited, the plunger 70 slides in the direction of approaching the outer peripheral portion of the ratchet wheel 52. By canceling the supply of electric power to the solenoid, the plunger 70 is pulled into the case 68. An engaging pawl 72 is formed at the ratchet wheel 52 side distal end portion of the plunger 70. Due to the plunger 70 protruding from the case 68, the engaging pawl 72 engages the ratchet teeth 64 formed at the outer peripheral portion of the ratchet wheel 52. In a state in which the engaging pawl 72 is engaged with the ratchet teeth 64, rotation of the ratchet wheel 52 in the pull-out direction is permitted, but rotation in the take-up direction is restricted.

Next, operation and effects of the present embodiment will be described.

In the present webbing take-up device 10, when the webbing belt 26 is to be applied to the body of a vehicle occupant, first, the webbing belt 26 is pulled out by an appropriate amount.

By pulling out the webbing belt 26, the spool 20 rotates in the pull-out direction, and the adapter 30 provided at the spool main body 22 rotates integrally with the spool 20. The adapter 30 is connected to the adapter 44 via the torsion coil spring 60. Thus, when the adapter 30 rotates, the adapter 44 attempts to follow this rotation. However, because the urging force of the spiral spring 48 is greater than the urging force of the torsion coil spring 60, the adapter 44 cannot rotate to follow the rotation of the adapter 30.

Figure 4:
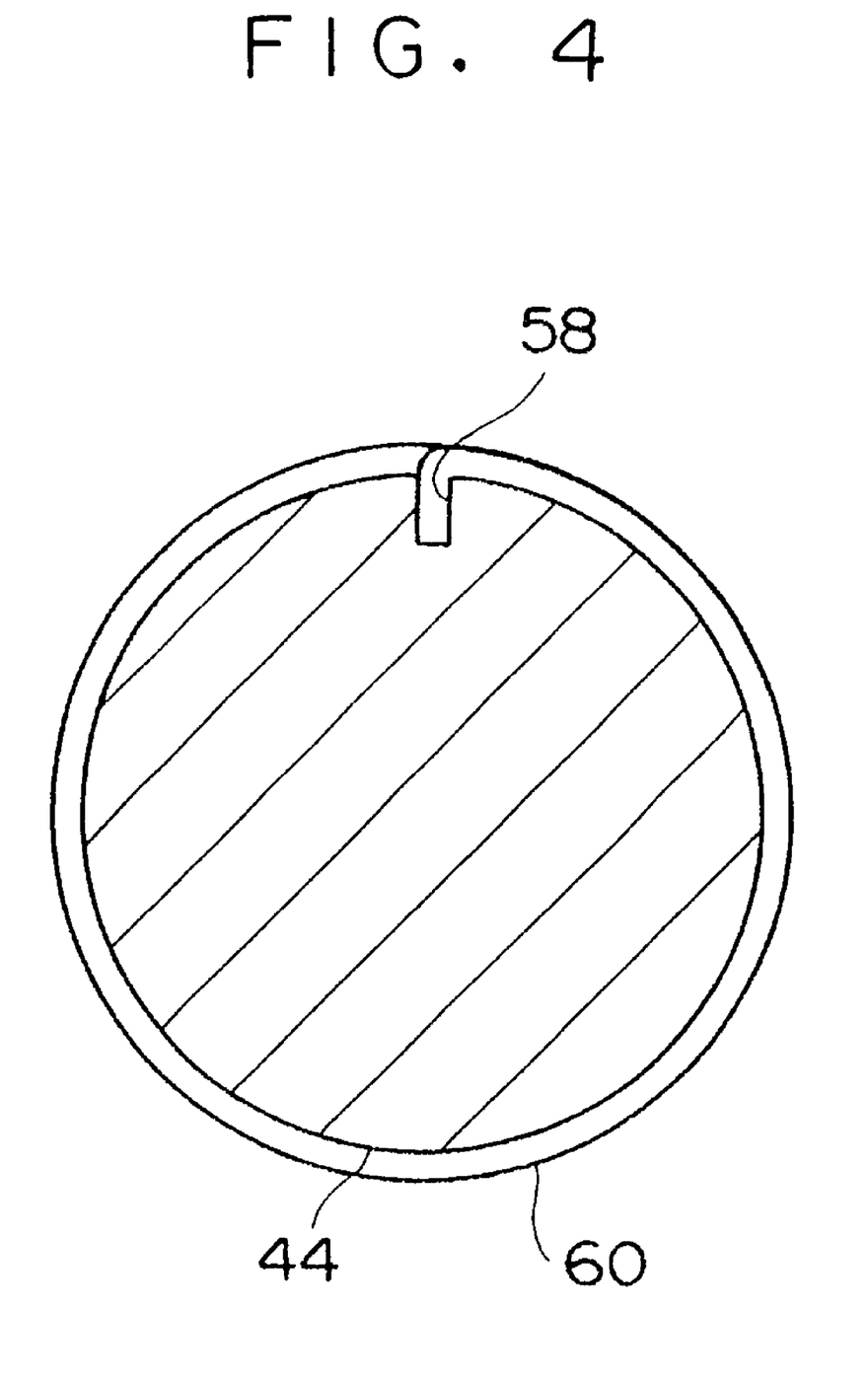
FIG. 4 is a sectional view illustrating a state of a second urging device in a state in which the second urging device makes the shaft member and an unillustrated take-up shaft integral.

When the adapter 30 rotates a predetermined angle relative to the adapter 44, as illustrated in FIG. 4, the torsion coil spring 60 is wound tighter and is fit tightly against the outer peripheral portions of the adapter 44 and the adapter main body 34 of the adapter 30 (the adapter 30 is not shown in FIGS. 4 through 6), and the adapter 30 and the adapter 44 become integral. In this state, due to the adapter 30 rotating in the pull-out direction, the adapter 44 rotates integrally in the pull-out direction against the urging force of the spiral spring 48, and due to the adapter 44 rotating in the pull-out direction, the urging force of the spiral spring 48 gradually increases and urges the adapter 44 in the take-up direction.

The adapter 44 is mechanically connected to the ratchet wheel 52 via the torsion coil spring 56. However, because the ratchet wheel 52 is basically free to rotate in the pull-out direction, due to the adapter 44 rotating in the pull-out direction, the ratchet wheel 52 is pulled in the pull-out direction due to the urging force of the torsion coil spring 56 and rotates in the pull-out direction so as to follow the rotation of the adapter 44.

Next, the webbing belt 26 is pulled out by an amount necessary for application thereof, or by an amount more than the necessary amount, and a tongue plate provided at the other end of the webbing belt 26 is, for example, engaged and locked with a buckle device provided at the side of a seat of the vehicle (the buckle device, the seat, and the vehicle are not illustrated). The other end of the webbing belt 26 is thereby fixed.

In this state, when application of pulling-out force to the webbing belt 26 is ceased and rotation of the spool 20 in the pull-out direction stops, until the webbing belt 26 is substantially in a completely applied state, the spiral spring 48 rotates the adapter 44 in the take-up direction, and rotates the spool 20 in the take-up direction via the adapter 30 which is integral with the adapter 44 due to the torsion coil spring 60 being wound tighter.

Figure 3:
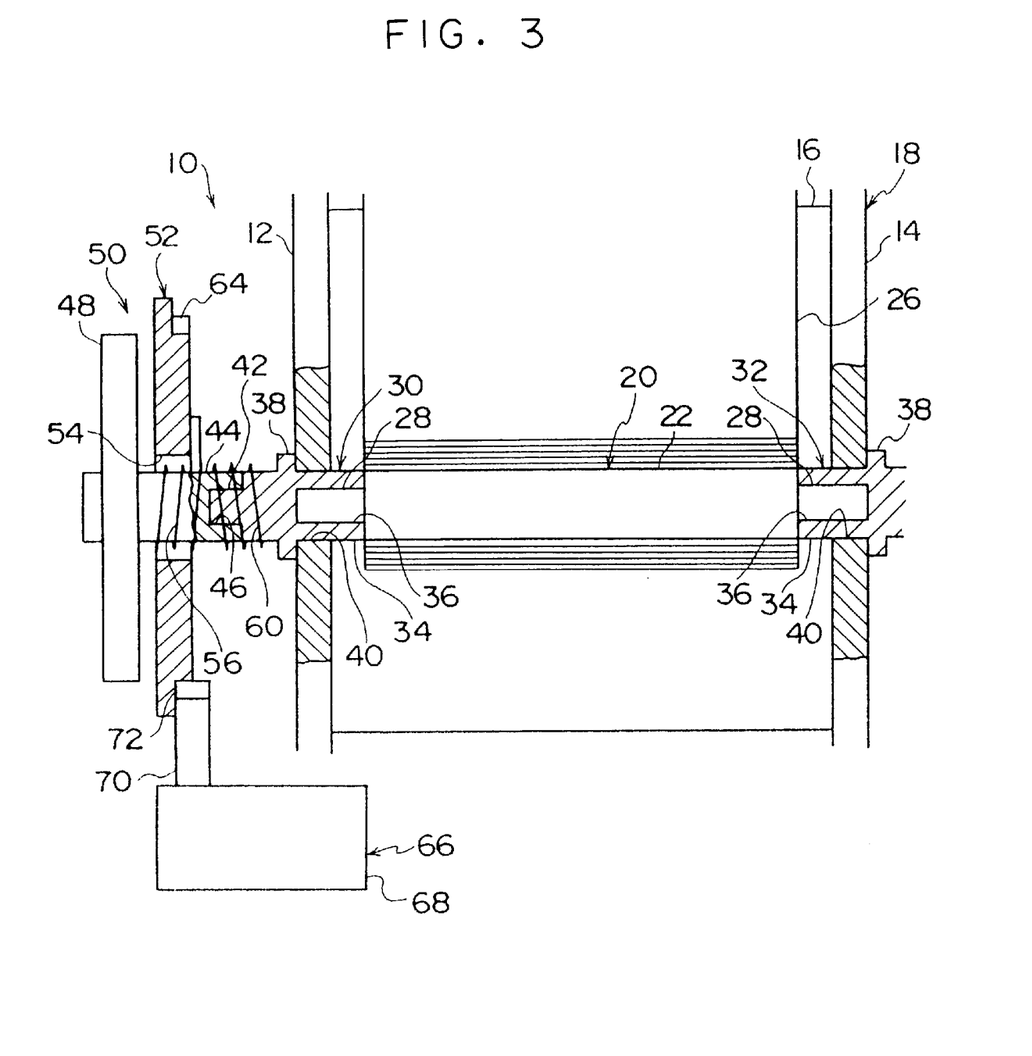
FIG. 3 is a vertical sectional view corresponding to FIG. 2 and illustrating a state in which a shaft member rotation restricting mechanism restricts rotation of a shaft member.

Here, as illustrated in FIG. 3, when the engaging pawl 72 of the plunger 70 engages the ratchet teeth 64 of the ratchet wheel 52 and rotation of the ratchet wheel 52 in the take-up direction is restricted, the ratchet wheel 52 cannot follow the rotation of the adapter 44 in the take-up direction. As a result, torsion coil spring 56 is wound tighter so as to be wound on and fit tightly to the outer peripheral portion of the adapter 44. Frictional force is thereby generated between the adapter 44 and the torsion coil spring 56.

Figure 5:
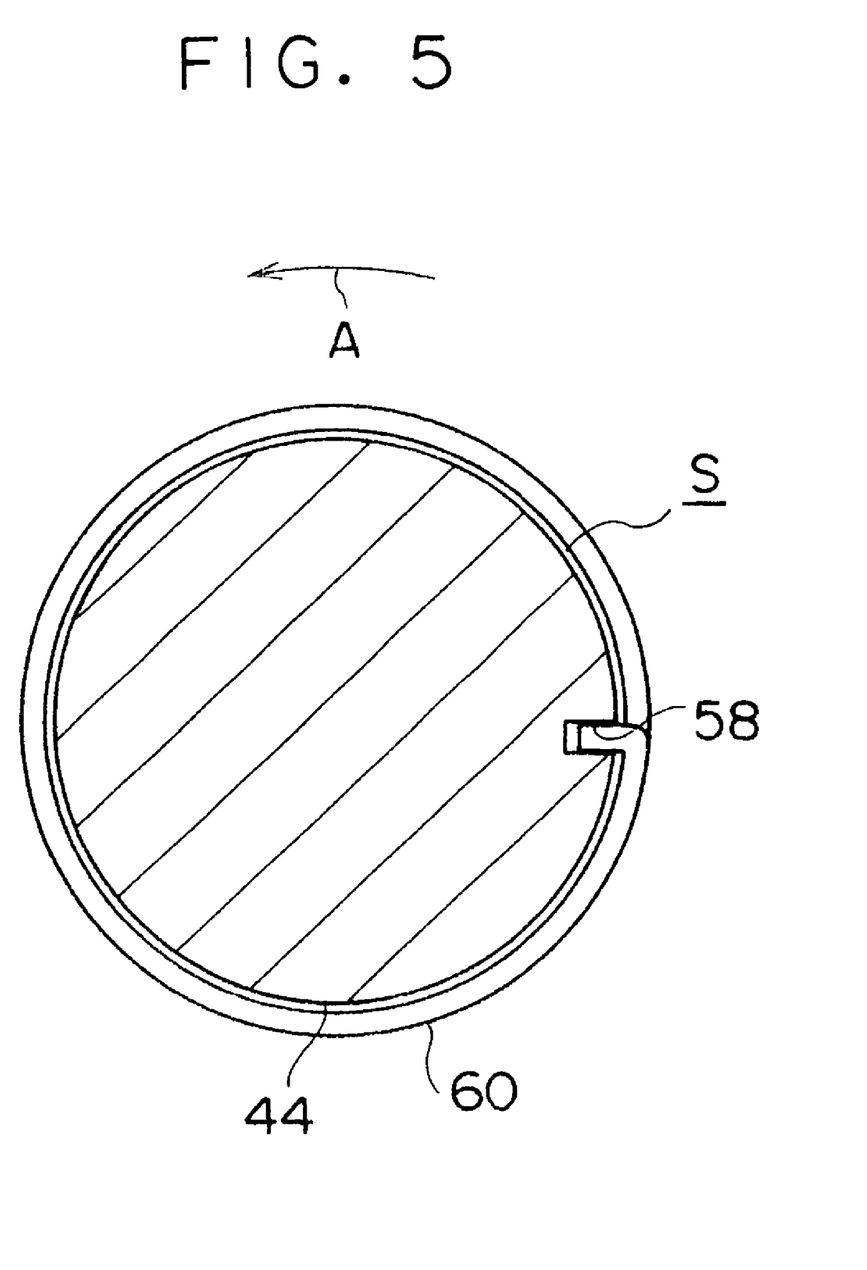
FIG. 5 is a sectional view corresponding to FIG. 4 and illustrating a state of the second urging device at the time when an integral state of the shaft member and the unillustrated take-up shaft due to the second urging device is canceled.

As described above, if such a frictional force is not applied, the torsion coil spring 60 is maintained in a state of being fit tightly around the outer peripheral portions of the adapter main body 34 of the adapter 30 and the adapter 44, due to the urging force of the spiral spring 48. However, because there is such a frictional force generated between the adapter 44 and the torsion coil spring 56, the urging force of the spiral spring 48 is partially offset by the frictional force. Therefore, the torsion coil spring 60 does not reach the state in which it is wound tightly around the outer peripheral portions of both the adapter main body 34 of the adapter 30 and the adapter 44. As illustrated in FIG. 5, a state, in which a space S is formed between the torsion coil spring 60 and the outer peripheral portions of both the adapter main body 34 of the adapter 30 and the adapter 44, is maintained. Namely, a state in which the torsion coil spring 60 is slack to a certain extent is maintained.

In this state, frictional force of the torsion coil spring 56 is applied against the urging force of the spiral spring 48 as described above. Thus, the pulling force in the take-up direction (the take-up force) applied to the webbing belt 26 via the adapter 44, the torsion coil spring 60, and the adapter main body 34 of the adapter 30 (i.e., the spool 20), is smaller than a case in which the urging force of the spiral spring 48 is applied as it is to the webbing belt 26. Thus, in a state in which the webbing belt 26 is applied, the restraining force by which the webbing belt 26 restrains the body of the vehicle occupant is low, and the compressing sensation in this applied state is mitigated.

Further, in this state, if the application of the webbing belt 26 is insufficient or the application of the webbing belt 26 is released, the spool 20 can be again rotated in the take-up direction. In this case, the torsion coil spring 60 rotates the adapter 30 (i.e., the spool 20) in the take-up direction by the urging force of the torsion coil spring 60, so as to wind the webbing belt 26 onto the spool main body 22. Due to the torsion coil spring 60 rotating the adapter 30 in the take-up direction, the urging force of the torsion coil spring 60 is small, and the resultant force of the urging force of the torsion coil spring 60 and the above-described frictional force is smaller than the urging force of the spiral spring 48.

Figure 6:
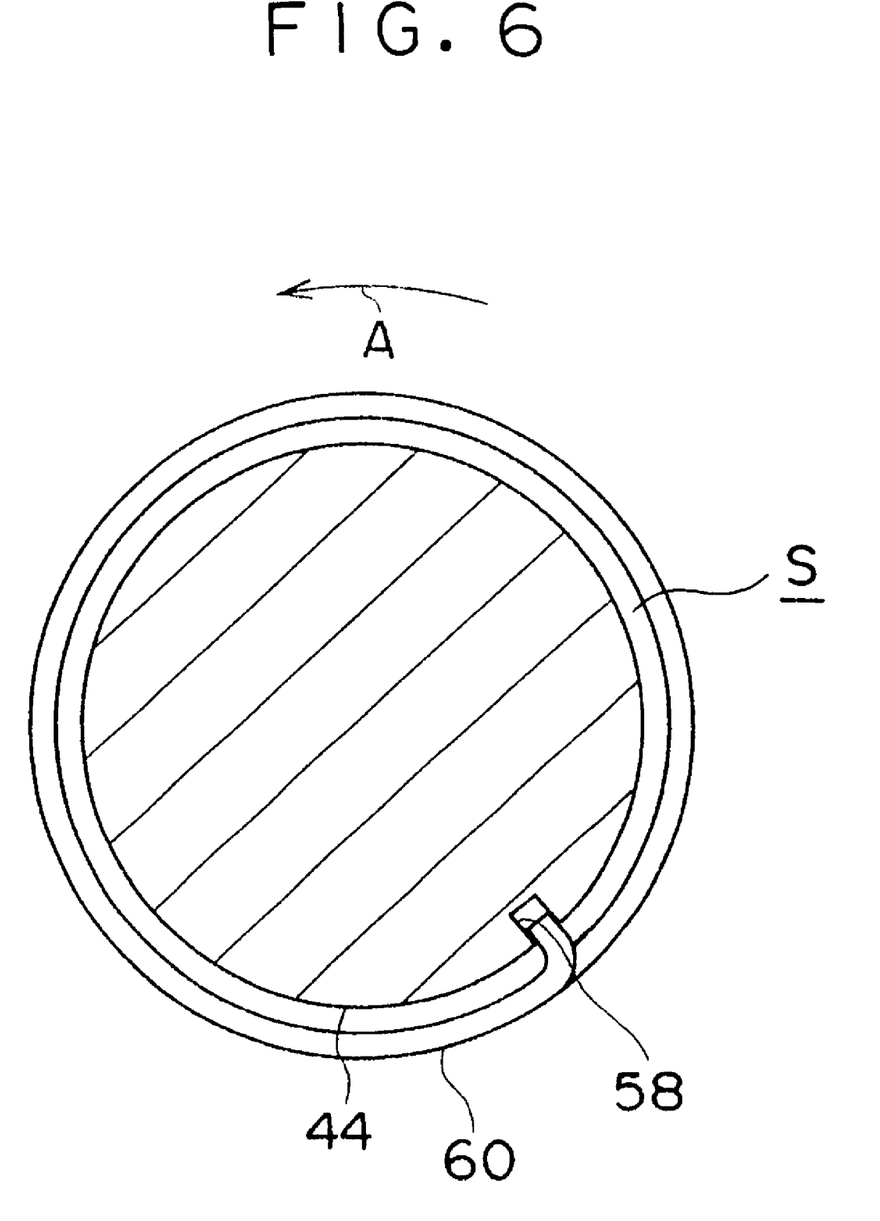
FIG. 6 is a sectional view corresponding to FIG. 4 and illustrating a state in which the shaft member rotates in a take-up direction from the state of FIG. 5.

Accordingly, the spiral spring 48 rotates the adapter 44 in the take-up direction by the urging force of the spiral spring 48 (see FIG. 6). Due to the spiral spring 48 rotating the adapter 44 in the take-up direction, the urging force becomes small, and due to the adapter 44 rotating in the take-up direction, the torsion coil spring 56 is wound even tighter onto the outer peripheral portion of the adapter 44 such that the frictional force increases. As a result, the torsion coil spring 60 does not reach a state in which it is fit tightly to the outer peripheral portions of both the adapter main body 34 of the adapter 30 and the adapter 44, and the space S is formed between the torsion coil spring 60 and the outer peripheral portion of the adapter 44.

In this state, when the webbing belt 26 is pulled out, the adapter 30 rotates in the pull-out direction together with the spool main body 22. However, because the torsion coil spring 60 is in a slack state, the adapter 30 rotates in the pull-out direction relative to the adapter 44 until the torsion coil spring 60 is fit tightly to the outer peripheral portions of both the adapter main body 34 of the adapter 30 and the adapter 44 (i.e., until the state in FIG. 4 is reached from the state in either FIG. 5 or FIG. 6). Due to the torsion coil spring 60 being fit tightly to the outer peripheral portions of both the adapter main body 34 of the adapter 30 and the adapter 44, the adapter 30 and the adapter 44 are made integral, and the urging force of the spiral spring 48 is transferred to the webbing belt 26. However, in a state in which the adapter 30 rotates relative to the adapter 44, it suffices for the urging force of the spiral spring 48 to not be transferred, and for the pulling force needed to pull out the webbing belt 26 to be of a magnitude which resists the urging force of the torsion coil spring 60 which is less than the urging force of the spiral spring 48. Accordingly, if the body of a vehicle occupant pulls the webbing belt 26 slightly due to slight vibrations or the like while the vehicle is traveling such as described above, for the pulling of the webbing belt 26 at this time, the force by which the webbing belt 26 restrains the body of the vehicle occupant is the magnitude of the urging force of the torsion coil spring 60 which is smaller than the urging force of the spiral spring 48. In this case, the compressive sensation felt by the vehicle occupant is mitigated.

In the above description, if the adapter 30 rotates relative to the adapter 44 up until the time that the torsion coil spring 60 is tightly fit to the outer peripheral portions of both the adapter main body 34 of the adapter 30 and the adapter 44, the urging force of the spiral spring 48 acts on the webbing belt 26. Therefore, in a case in which the body of the vehicle occupant moves greatly such as at the time the vehicle rapidly decelerates or the like, and an attempt is made to pull out the webbing belt 26 greatly thereby, the urging force of the spiral spring 48 acts on the webbing belt 26, such that the body of the vehicle occupant can be reliably restrained.

As described above, in the present invention, when a webbing belt is pulled out, the urging force applied in the direction of taking up the webbing belt can be reduced such that the compressive sensation can be mitigated.

What is claimed is:

1. A webbing take-up device for taking up an elongated webbing belt for restraining a body of a vehicle occupant, the webbing take-up device comprising:

(a) a take-up shaft to which one longitudinal direction end of the webbing belt is anchored, and which takes up the webbing belt by rotating in a take-up direction which is one direction around an axis of the take-up shaft;

(b) a shaft member provided so as to be rotatable coaxially with and relatively to the take-up shaft;

(c) a first urging device connected to the shaft member, the first urging device urging the shaft member in the take-up direction by urging force of a magnitude corresponding to an amount of rotation of the shaft member in a pull-out direction which is opposite to the take-up direction; and (d) a second urging device connecting the take-up shaft and the shaft member such that the take-up shaft and the shaft member are able to rotate relatively over a predetermined angle, and when an angle of rotation in the pull-out direction of the shaft member with respect to the take-up shaft exceeds a predetermined angle, the second urging device connects the shaft member and the take-up shaft integrally such that the shaft member and the take-up shaft are able to rotate in the pull-out direction.

2. A webbing take-up device according to claim 1, wherein when the shaft member and the take-up shaft rotate relatively within a predetermined angle, the second urging device urges the shaft member in a direction opposite to a rotating direction, by an urging force that is smaller than the urging force of the first urging device.

3. A webbing take-up device according to claim 2, further comprising:

a shaft member rotation restricting mechanism which, in a state in which an angle of rotation in the pull-out direction of the shaft member with respect to the take-up shaft exceeds a predetermined angle, enables application to the shaft member of a restricting force for restricting rotation of the shaft member in the take-up direction, and enables canceling of the restricting force, such that a resultant force with the urging force of the second urging device becomes larger than the urging force of the first urging device.

4. A webbing take-up device according to claim 3, wherein the shaft member rotation restricting mechanism includes:

a rotating body provided coaxially with respect to the shaft member; and a third urging device connecting the shaft member and the rotating body such that the shaft member and the rotating body are relatively rotatable over a predetermined angle, wherein when the shaft member and the rotating body rotate relatively within a predetermined angle, the third urging device urges the rotating body in a direction opposite to a direction of relative rotation by an urging force which is of a magnitude corresponding to an amount of the relative rotation and which is smaller than the urging force of the first urging device, and when an angle of the rotating body with respect to the shaft member reaches a predetermined angle, the third urging device is fit tightly to an outer peripheral portion of the shaft member.

5. A webbing take-up device according to claim 4, wherein the shaft member rotation restricting mechanism also has a rotating body rotation restricting device which restricts rotation of the shaft member in the take-up direction via the rotating body and the third urging device, and is able to cancel restriction of rotation of the rotating body in the take-up direction.

6. A webbing take-up device according to claim 5, wherein the rotating body rotation restricting device includes a plunger which is movable in directions of approaching and moving away from an outer peripheral portion of the rotating body, the plunger having a pawl which engages with the rotating body so as to restrict rotation of the rotating body in the take-up direction.

7. A webbing take-up device according to claim 6, wherein the rotating body has, around an axis, teeth which engage with the pawl.

8. A webbing take-up device according to claim 1, wherein the shaft member is connected to the rotating shaft via a connecting member which is able to rotate integrally with the rotating shaft.

9. A webbing take-up device according to claim 8, wherein the rotating shaft is supported at a vehicle body via the connecting member.

10. A webbing take-up device according to claim 8, wherein the second urging device is connected to the connecting member and the shaft member.

11. A webbing take-up device used in a seat belt device of a vehicle, the webbing take-up device comprising:
   (a) a take-up shaft to which one end of a webbing is anchored, and which is able to rotate in a webbing take-up direction and in a webbing pull-out direction which is opposite to the webbing take-up direction;
   (b) a first urging device which urges the take-up shaft in the webbing take-up direction;
   (c) a second urging device which, while rotation of the take-up shaft in the webbing pull-out direction is within a predetermined angle, urges the take-up shaft in the webbing pull-out direction by an urging force which is less than an urging force of the first urging device, and
   (d) a shaft member which connects the take-up shaft and the first urging device, the shaft member provided coaxially with the take-up shaft and able to rotate a predetermined angle relatively with respect to the take-up shaft.

12. A webbing take-up device according to claim 11, wherein when rotation of the take-up shaft in the webbing pull-out direction exceeds a predetermined angle, the second urging device connects the take-up shaft and the shaft member such that the take-up shaft and the shaft member are rotatable integrally.

13. A webbing take-up device according to claim 12, further comprising:
   a shaft member rotation restricting mechanism which restricts rotation of the shaft member in the webbing take-up direction, the shaft member rotation restricting mechanism having a rotating body which is provided so as to be rotatable over a predetermined angle around the shaft member, and a third urging device which connects the shaft member and the rotating body.

14. A webbing take-up device according to claim 13, wherein when rotation of the rotating body in the webbing take-up direction with respect to the shaft member exceeds a predetermined angle, the third urging device fixedly holds the rotating body and the shaft member.

15. A webbing take-up device according to claim 14, wherein the shaft member rotation restricting mechanism has a rotating body rotation restricting device which restricts rotation of the rotating body in the webbing take-up direction, the rotating body rotation restricting device having a pawl which engages with teeth provided at the rotating body so as to restrict rotation of the rotating body in the webbing take-up direction.

* * * * *